United States Patent
Schaertel et al.

(10) Patent No.: US 9,264,558 B2
(45) Date of Patent: Feb. 16, 2016

(54) SYSTEM FOR VERIFYING ACCURACY OF A RASTER SCANNED IMAGE OF A DOCUMENT

(71) Applicant: KODAK ALARIS INC., Rochester, NY (US)

(72) Inventors: David M. Schaertel, Webster, NY (US); Nelson A. Blish, Rochester, NY (US); Daniel P. Phinney, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 13/714,901

(22) Filed: Dec. 14, 2012

(65) Prior Publication Data

US 2014/0168733 A1 Jun. 19, 2014

(51) Int. Cl.
| | |
|---|---|
| H04N 1/46 | (2006.01) |
| H04N 1/04 | (2006.01) |
| G06K 9/20 | (2006.01) |
| G06K 9/00 | (2006.01) |
| H04N 1/00 | (2006.01) |
| H04N 1/12 | (2006.01) |

(52) U.S. Cl.
CPC ......... *H04N 1/00005* (2013.01); *H04N 1/0005* (2013.01); *H04N 1/00018* (2013.01); *H04N 1/00034* (2013.01); *H04N 1/00047* (2013.01); *H04N 1/00063* (2013.01); *H04N 1/00087* (2013.01); *H04N 1/1215* (2013.01)

(58) Field of Classification Search
None
See application file for complete search history.

(56) References Cited

U.S. PATENT DOCUMENTS

| | | | | |
|---|---|---|---|---|
| 5,249,069 | A * | 9/1993 | Petilli | 358/488 |
| 5,424,804 | A * | 6/1995 | Pultorak | G03B 27/465 |
| | | | | 355/68 |
| 5,828,461 | A * | 10/1998 | Kubo et al. | 358/296 |
| 5,828,781 | A * | 10/1998 | Nakano | 382/167 |
| 6,522,430 | B1 * | 2/2003 | Dalal et al. | 358/406 |
| 6,987,892 | B2 * | 1/2006 | Edgar | 382/254 |
| 7,403,313 | B2 * | 7/2008 | Kuo | 358/486 |
| 2001/0007138 | A1 * | 7/2001 | Iida et al. | 714/25 |
| 2002/0001393 | A1 * | 1/2002 | Jones et al. | 382/100 |
| 2002/0149799 | A1 * | 10/2002 | Hayashi | 358/406 |
| 2003/0053085 | A1 * | 3/2003 | Takemoto | 358/1.9 |
| 2003/0076518 | A1 * | 4/2003 | Miyake et al. | 358/1.9 |
| 2004/0080795 | A1 * | 4/2004 | Bean et al. | 358/505 |
| 2004/0249594 | A1 * | 12/2004 | Satoh et al. | 702/104 |
| 2005/0240376 | A1 * | 10/2005 | Uwatoko et al. | 702/183 |
| 2005/0281459 | A1 * | 12/2005 | Bala et al. | 382/162 |
| 2006/0039629 | A1 * | 2/2006 | Li et al. | 382/289 |
| 2006/0071946 | A1 * | 4/2006 | Anabuki et al. | 345/633 |
| 2006/0215115 | A1 * | 9/2006 | Long et al. | 352/38 |
| 2007/0097456 | A1 * | 5/2007 | Kelly | H04N 1/00002 |
| | | | | 358/488 |
| 2007/0109511 | A1 * | 5/2007 | Kelly | H04N 1/00681 |
| | | | | 355/41 |
| 2007/0258633 | A1 * | 11/2007 | Jones et al. | 382/135 |
| 2008/0013848 | A1 * | 1/2008 | Wu et al. | 382/254 |

(Continued)

*Primary Examiner* — Madelein Nguyen
(74) *Attorney, Agent, or Firm* — Hogan Lovells US LLP

(57) ABSTRACT

A system for verifying accuracy of a raster scanned image of a document (20) includes an input tray (30) that holds documents prior to imaging; an input imaging device (40) that captures an image of a document in the input tray; transmitting the captured input tray image to an image processor (100); transporting the document through a document scanner (10); a raster capture device for capturing a raster scanned image of the document with; transmitting the raster scanned image to the image processor; and verifying the accuracy of the raster scanned image by comparing the raster scanned image of the document to the input tray image of the document.

7 Claims, 3 Drawing Sheets

(56) References Cited

U.S. PATENT DOCUMENTS

| | | | |
|---|---|---|---|
| 2009/0080036 A1* | 3/2009 | Paterson et al. | 358/474 |
| 2009/0096879 A1* | 4/2009 | Motomura et al. | 348/208.6 |
| 2010/0118355 A1* | 5/2010 | Hanagata | 358/475 |
| 2010/0182637 A1* | 7/2010 | Tamura | 358/1.15 |
| 2010/0188714 A1* | 7/2010 | Yamakawa | 358/504 |
| 2011/0096370 A1* | 4/2011 | Okamoto | 358/444 |
| 2011/0122456 A1* | 5/2011 | Ishii et al. | 358/448 |
| 2011/0134491 A1* | 6/2011 | Golding | H04N 1/401 358/453 |
| 2011/0170125 A1* | 7/2011 | Asada | 358/1.12 |
| 2011/0193944 A1* | 8/2011 | Lian et al. | 348/47 |
| 2011/0238423 A1* | 9/2011 | Schaertel | B65H 5/062 704/270 |
| 2012/0019841 A1* | 1/2012 | Schaertel | H04N 1/00326 358/1.9 |
| 2012/0019874 A1* | 1/2012 | Schaertel | H04N 1/00588 358/474 |
| 2012/0044548 A1* | 2/2012 | Schaertel | H04N 1/0062 358/498 |
| 2012/0229872 A1* | 9/2012 | Dolev | 358/448 |
| 2012/0281132 A1* | 11/2012 | Ogura et al. | 348/348 |
| 2012/0327486 A1* | 12/2012 | Lee et al. | 358/505 |
| 2013/0044342 A1* | 2/2013 | Kaneko et al. | 358/1.13 |
| 2013/0076857 A1* | 3/2013 | Kurashige et al. | 348/40 |
| 2013/0093136 A1* | 4/2013 | Sakharshete | G03G 15/6511 271/258.01 |
| 2013/0194615 A1* | 8/2013 | Lathrop et al. | 358/1.15 |
| 2014/0168717 A1* | 6/2014 | Schaertel | H04N 1/00694 358/474 |

\* cited by examiner

SYSTEM FOR VERIFYING ACCURACY OF A RASTER SCANNED IMAGE OF A DOCUMENT

CROSS REFERENCE TO RELATED APPLICATIONS

Reference is made to commonly-assigned copending U.S. patent application Ser. No. 13/714,885, filed Dec. 14, 2012, entitled METHOD OF CAPTURING AN IMAGE OF A DOCUMENT, by Schaertel et al.; U.S. patent application Ser. No. 13/714,863, filed Dec. 14, 2012, entitled VERIFYING ACCURACY OF A SCANNED DOCUMENT, by Schaertel et al.; U.S. patent application Ser. No. 13/714,926, filed Dec. 14, 2012, entitled SYSTEM FOR CAPTURING AN IMAGE OF A DOCUMENT, by Schaertel et al.; U.S. patent application Ser. No. 12/858,488 (now U.S. Publication No. 2012/0044547), filed Aug. 18, 2010, entitled A DOCUMENT SCANNER, by Schaertel et al.; U.S. patent application Ser. No. 12/839,476, filed Jul. 20, 2010, entitled METHOD FOR DOCUMENT SCANNING, by Schaertel et al.; U.S. patent application Ser. No. 12/839,471, filed Jul. 20, 2010, entitled A DOCUMENT SCANNER, by Schaertel et al.; and U.S. patent application Ser. No. 12/276,641 (now U.S. Publication No. 2010/0127447), filed Nov. 24, 2008, entitled DOCUMENT TRANSPORT APPARTUS, by Hammen; the disclosures of which are incorporated herein.

FIELD OF THE INVENTION

This invention relates to scanners in general, and in particular to verifying the accuracy of a scanned document.

BACKGROUND OF THE INVENTION

A document scanner moves a document through a transport path and creates a digital image of the document as it moves. The processor for the document scanner has preset document characteristics and the operator must select functions and features to accommodate the specific requirements for a particular type of document. Alternately, the scanner may default to less efficient settings that will process all documents since scanners are not typically programmed with specific requirements on a document-by-document basis.

The preset characteristics include document characteristics such as size, weight, texture; and specific application requirements such as resolution and imaging mode, color, simplex, or duplex. In a document scanner, the documents to be scanned may vary by size, weight, color content, physical condition, or other characteristics, which may require different scanner features to be enabled or operator actions to be employed for the most optimal and efficient mode of operation. Prior knowledge of these many different document attributes can enable the proper selection of scanner features to improve the efficiency of the scanning process or enable other features which may provide specific applications required by a particular type, style, or size of document. Prior knowledge of the documents physical condition can also prompt immediate action from the operator to protect the document or scanner or allow other features within the scanner to perform more reliably.

The exit area of the scanner is used for collecting the scanned documents as they exit the transport. A document must also exit the scanner, once it has been imaged, in an orderly fashion. By discerning document characteristics in the input area as well as the exit area, characteristics such as, but not limited to, number of documents, the exit area features which control stacking and tracking can be managed.

During the scanning process there are a number of ways in which the information extracted from a scanned document may be inaccurate. The scanned document may be deformed or wrinkled by the document transport system, there may be dust or foreign matter on the image capture optics, the document may be skewed or misaligned, or incorrect scanning features may have been selected, but not limited to, all of which may result in capture of inaccurate information during the scanning process. There exists a need to verify captured image data, especially in high speed document scanners.

There have been attempts in the document printing industry to verify information on printed images, but the requirements for printing a document are different than the requirements for accurate scanning of a document. For example, U.S. Publication No. 2008/0013848, discloses a line-by-line scan of a printed document to check for defects such as streaks or banding in the printed document. U.S. Publication No. 2003/0076518, discloses a printer which incorporates a CCD raster capture device which images the output tray. The captured output image is compared to data used to print the document.

SUMMARY OF THE INVENTION

Briefly, according to one aspect of the present invention a system for verifying accuracy of a raster scanned image of a document includes an input tray that holds documents prior to imaging; an input imaging device that captures an image of a document in the input tray; transmitting the captured input tray image to an image processor; transporting the document through a document scanner; a raster capture device for capturing a raster scanned image of the document with; transmitting the raster scanned image to the image processor; and verifying the accuracy of the raster scanned image by comparing the raster scanned image of the document to the input tray image of the document.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
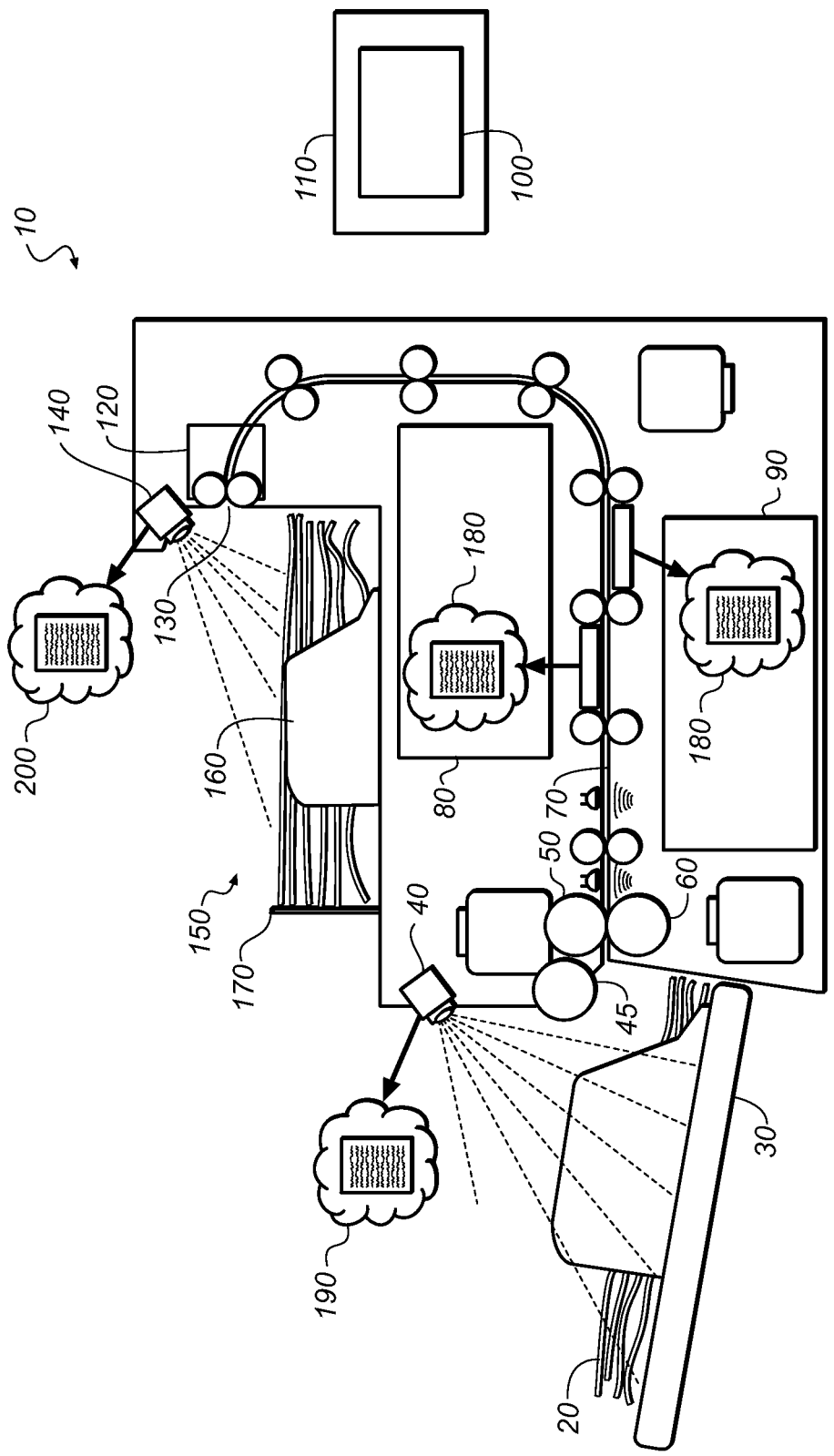
FIG. 1 is a cross-sectional view from the side of a transport for a document scanner according to the present invention.

FIG. 1 is a side cross-sectional view of a document scanner 10. As shown in FIG. 1, documents 20 are first placed in the input tray 30 of the scanner 10. The document is moved forward into the scanner 10 by the urging roller 45, then the feed roller 50 while additional documents 20 are held back by the separation roller 60. The document 20 continues through the document transport 70, is imaged by the front and rear raster capture devices 80 and 90 respectively, and then moves out of the transport exit 130 into the output tray 150.

As, or after, the document 20 exits the transport 70 at the transport exit 130, the document 20 and the output tray 150 are imaged by the output imaging device 140. The images are sent to the image processor 100 to discern document 20 and output tray 150 characteristics.

One output tray 150 characteristic is whether or not there are documents 20 present in the output tray 150. If the output tray 150 is determined to be empty the processor 110 will determine how many documents 20 can be scanned before the output tray 150 becomes full. Also determining the output tray 150 level of documents will be used by the processor 110 to stop scanning if the output tray 150 becomes full. This may happen if the operator continues to place documents 20 in the input tray 30 while scanning without removing documents (20) from the output tray 150.

Another important characteristic is the stacking of the documents 20 in the output tray 150. If the documents 20 are not laying flat, one on top of another, the processor 110 will stop the scanning process and prevent additional documents 20 from stacking improperly. Improper stacking may be an indication of the controlled output stacking 120 feature not operating properly or being inadvertently turned off. Based on the output tray 150 characteristics, proper adjustment of the output tray side guides 160 or end stop 170 will be determined. The scanning may be stopped for the operator to adjust the side guides 160 or end stop 170, or an auto adjust feature can be employed to make the correction while scanning is continued.

Figure 2:
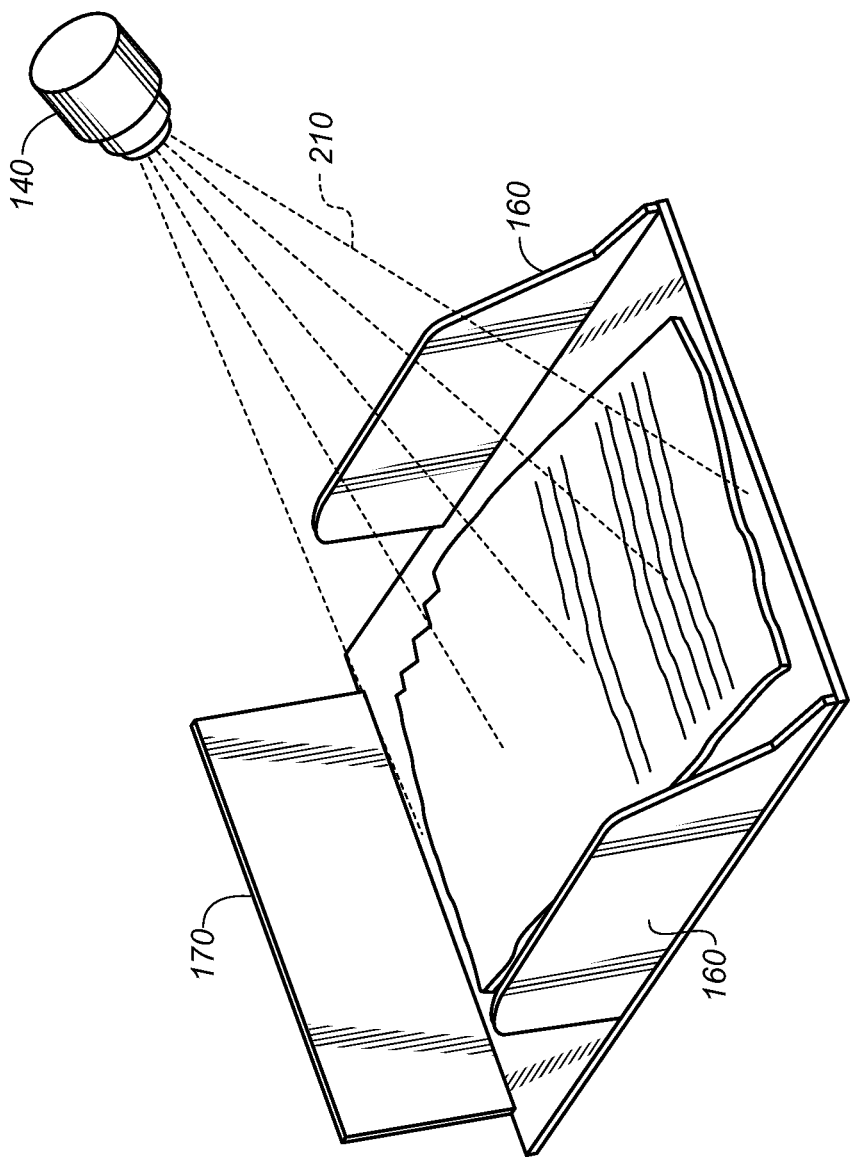
FIG. 2 is a perspective view of a scanner output tray according to the present invention.

Based on document information from an input imaging device 40 the condition of the document 20 exiting the scanner 10 will be compared to condition of documents 20 entering the scanner 10 to determine if damage to the document 20, such as bent or torn corners, is occurring within the document transport 70, as is shown in FIG. 2. The processor 110 will then stop the scanning process and alert the operator.

Using the information from the input imaging device 40 the number of documents 20 entering the document scanner 10 can be compared to the number of documents 20 exiting the scanner 10. If the number of documents 20 exiting the document scanner 10 does not match the number of documents 20 entering the document scanner 10 the operator will be alerted to the lost document 20.

Figure 3:
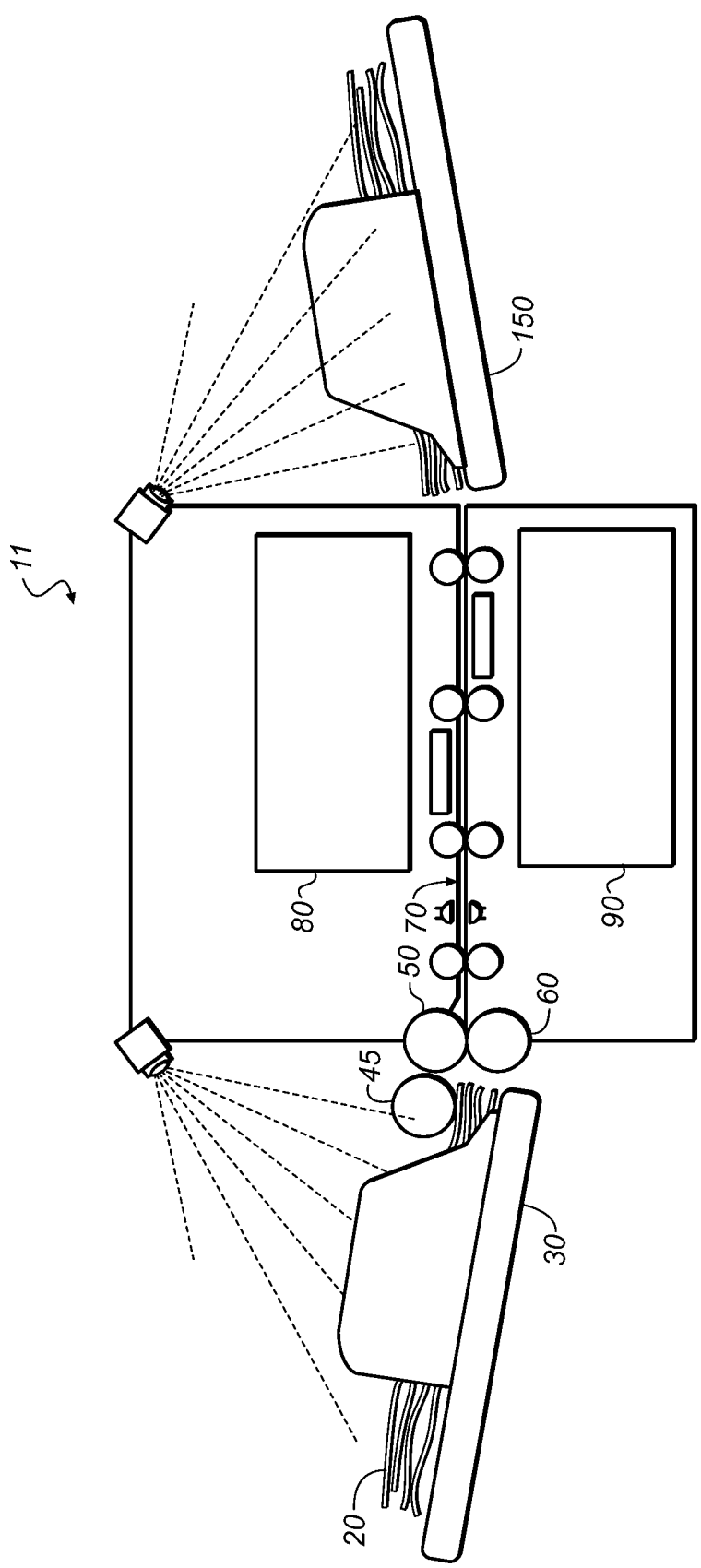
FIG. 3 is a cross-sectional view from the side of a straight through transport of a document scanner according to the present invention.

In a C-shape document transport 70 the document 20 order can be tracked using document 20 content captured by the output imaging device 140 in conjunction with the rear raster capture device 90. In document scanner 11, shown in FIG. 3, having a straight through document transport 70, the document 20 order can be tracked using the document 20 content captured by the output imaging device 140 in conjunction with the front raster capture device 80.

In one embodiment of the invention, an image of a document 20 in an input tray 30 is captured with an input imaging device 40 such as a raster capture device, CCD sensor, or CMOS sensor. The captured input tray image 190 is transmitted to an image processor 100 such as a microprocessor or a computer. The document is then transported through a document scanner 10 which captures a raster scanned image 180 of the document 20 and the raster scanned image 180 is transmitted to the image processor 100. The image processor 100 verifies the accuracy of the raster scanned image 180 by comparing the raster scanned image 180 of the document 20 to the input tray image 190 of the document 20. If the raster scanned image 180 of the document 20 does not match the input tray image 190 of the document 20, scanner 10 functions may be modified or other corrective actions taken. Corrective actions may include rotation of the raster capture device, changing a color capture mode, or cleaning image optics.

The input tray image 190 of the document 20 is captured as an area image 210 rather than raster by raster as is typically used to capture the raster scanned image 180 of the document 20. The input tray image 190 of the document 20 may be low resolution or high resolution.

In another embodiment of the invention, the document 20 is moved to an output tray 150 for holding documents 20 after it exits the scanner 10 and an image of the document 20 in the output tray 150 is captured with an output imaging device 140. The captured output tray 150 image is transmitted to the image processor 100 which verifies the accuracy of the raster scanned image 180 by comparing the raster scanned image 180 of the document 20 to the input tray image 190 of the document 20 and the output tray image 200 of the document 20.

In yet another embodiment of the invention, an image of a document 20 in an input tray 30 for holding documents 20 is captured as an area image 210 rather than raster by raster with an input imaging device 40. Capturing the image as an area image 210 means that an image of the entire document 20 is taken rather than imaging the document 20 raster by raster, which is the usual way of scanning a document 20. The captured input tray image 190 is transmitted to an image processor 100 and the document 20 is transported to an output tray 150. After the first document 20 has been transported out of the input tray 30, an image of a second document 20 in the input tray 30 is captured and transmitted to the image processor 100.

In a further embodiment, an image of the document 20 in the output tray 150 is captured with an output imaging device 140 and transmitted to the image processor 100. The accuracy of the input tray 30 image is verified by comparing the input tray image 190 of the document to the output tray image 200 of the document 20.

The invention has been described in detail with particular reference to certain preferred embodiments thereof, but it will be understood that variations and modifications can be effected within the scope of the invention.

PARTS LIST 10 document scanner
11 document scanner
20 documents
30 input tray
40 input imaging device
45 urging roller
50 feed roller
60 separation roller
70 document transport
80 front raster capture device
90 rear raster capture device
100 image processor
110 processor
120 controlled output stacking
130 transport exit
140 output imaging device
150 output tray
160 output tray side guides
170 end stop
180 raster scanned image
190 input tray image
200 output tray image
210 area image

The invention claimed is:

1. A system for verifying accuracy of a raster scanned image of a document comprising:
   an input tray that holds documents prior to imaging;
   an input imaging device that captures an image of an unaltered document in the input tray;
   an image processor configured to receive the captured image of the unaltered document in the input tray;
   a document transport system configured to transport the unaltered document through a document scanner;
   a raster capture device for capturing a raster scanned image of the unaltered document, wherein the raster scanned image is transmitted to the image processor;
   wherein the image processor is configured to verify the accuracy of the raster scanned image by comparing the raster scanned image of the unaltered document to the captured input tray image of the unaltered document; and
   wherein the image processor is further configured to modify scanner functions if the raster scanned image of the unaltered document does not match the captured input tray image of the unaltered document.

2. The system as in claim 1 wherein the scanner functions are selected from a group consisting of rotation of the raster capture device, changing a color capture mode, or cleaning image optics.

3. The system as in claim 1 wherein the input tray image of the unaltered document is captured as an area image.

4. The system as in claim 1 wherein the input tray image of the unaltered document is low resolution.

5. The system as in claim 1 wherein the input tray image of the unaltered document is high resolution.

6. The system as in claim 1, wherein the image processor is configured to alert a document scanner operator if the raster scanned image of the document does not match the input tray image of a document.

7. The system as in claim 1 further comprising:
   an output tray for holding documents after the documents exit the scanner;
   wherein the image processor is configured to receive the image; and
   wherein the image processor is configured to verify the accuracy of the raster scanned image by comparing the raster scanned image of the document to the input tray image of the unaltered document or the output tray image of the document or both.

* * * * *